United States Patent [19]
Fletcher et al.

[11] 3,760,257
[45] Sept. 18, 1973

[54] ELECTROMAGNETIC WAVE ENERGY CONVERTER

[76] Inventors: James C. Fletcher, Administrator of the National Aeronautics and Space Administration with respect to an invention of; Robert L. Bailey, Gainesville, Fla.

[22] Filed: Sept. 27, 1972

[21] Appl. No.: 292,698

[52] U.S. Cl..................... 321/1.5, 136/89, 250/212
[51] Int. Cl.................................................... H02m
[58] Field of Search....................... 136/89; 250/212; 333/21; 321/1.5

[56] References Cited
UNITED STATES PATENTS

| | | | |
|---|---|---|---|
| 3,026,439 | 3/1962 | Geer | 250/212 X |
| 3,121,648 | 2/1964 | Jensen | 136/89 |
| 3,232,795 | 2/1966 | Gillette et al. | 250/212 X |
| 3,350,234 | 10/1967 | Ule | 250/212 X |
| 3,427,200 | 2/1969 | Lapin et al. | 136/89 |
| 3,448,273 | 6/1969 | Webb | 250/212 X |
| 3,615,853 | 10/1971 | Paine | 136/89 |

*Primary Examiner*—William M. Shoop, Jr.
*Attorney*—R. F. Kempf et al.

[57] ABSTRACT

Electromagnetic wave energy is converted into electric power with an array of mutually insulated electromagnetic wave absorber elements each responsive to an electric field component of the wave as it impinges thereon. Each element includes a portion tapered in the direction of wave propagation to provide a relatively wideband response spectrum. Each element includes an output for deriving a voltage replica of the electric field variations intercepted by it. Adjacent elements are positioned relative to each other so that an electric field subsists between adjacent elements in response to the impinging wave. The electric field results in a voltage difference between adjacent elements that is fed to a rectifier to derive d.c. output power. The element pairs may be arranged in a two-dimensional array to provide power conversion of randomly polarized electromagnetic waves, such as sunlight.

19 Claims, 3 Drawing Figures

Patented Sept. 18, 1973

3,760,257

ELECTROMAGNETIC WAVE ENERGY CONVERTER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF INVENTION

The present invention relates generally to devices for converting electromagnetic wave energy into electric power and, more particularly, to a device including a number of relatively closely spaced electromagnetic wave absorber elements having tapered portions responsive to wide band electromagnetic wave radiation.

BACKGROUND OF THE INVENTION

Devices for converting radiant energy into usable power have been considered extensively in the past. Presently, the most commonly utilized devices for converting radiant energy into usable power are solar cells which are adapted to convert solar energy directly into electricity for power generating purposes. Solar cells generally include oppositely doped semiconductor junctions which generate current in response to solar energy impinging thereon. Solar cells depend for their operation on quantum properties of light energy to provide charge separation and hence current flow in the junction region. To date, the maximum efficiency of solar cells in converting solar energy into electric energy is approximately 13 percent. In addition to the relatively low conversion efficiency of solar energy into electric power, solar cells are very expensive, as well as fragile, and usually must be mounted on a rigid, preferably flat substrate. The requirement for a rigid, flat substrate frequently substantially increases the combined cost of the solar cells and their supporting structure; if the supporting structure is a spacecraft panel, problems of folding the panel and maintaining it in a rigid condition in use are encountered.

BRIEF DESCRIPTION OF THE INVENTION

In accordance with the present invention, the wave properties of electromagnetic energy are utilized to convert wide band electromagnetic wave energy into usable electric power. The wide band energy impinges on an array of tapered absorber elements mutually insulated from each other. The length, base area, and separation of the elements are such that relatively wide band energy can be absorbed. To achieve maximum conversion of wide band energy, each element has a length, in the direction of wave propagation, equal to several wavelengths of the longest wavelength energy to be converted. Adjacent elements have spaced, sloping converging sides to enable maximum conversion of energy wavelengths in the spectrum to be converted. A voltage replica of the electric field variations absorbed by each element is derived at an output of each element. The difference between the voltage variations derived from adjacent elements is derived and supplied to a rectifier to provide the power conversion. To maximize the voltage difference, bases of adjacent absorber elements are spaced from each other by less than one wave length and preferably less than ½ wavelength, of the received energy. The close spacing, relatively long length and tapered sides also enable the absorber elements to function effectively as absorbers and prevent substantial re-radiation and reflection of the energy impinging thereon because the wave radiation is trapped in the converging interstices between the abosrbing elements.

In a preferred embodiment, the absorbers are formed of metallic elements, such as copper or other suitable material; however, absorbers may consist of dielectric elements which function to direct the electromagnetic wave energy onto an electromagnetic wave energy-to-electric voltage converter that derives a voltage replica of the wave energy.

The invention may be utilized in conjunction with converting wave energy from the microwave region through the visible light spectrum. If the invention is utilized for wave lengths in the solar spectrum, it is ideally suited for use as a solar energy-to-electric power converter. In such a configuration, the absorber elements and electric components utilized for converting the voltage wave replicas into electric power might be formed utilizing integrated circuit type manufacturing processes.

If the device is utilized for absorbing plane polarized electromagnetic waves, adjacent elements in the direction of the wave electric field are aligned with each other in pairs such that maximum electric field variations are derived between them but adjacent elements at right angles to the electric field are packed as close as possible to each other without electric contact, to maximize the active absorber area. If the electromagnetic wave radiation is circularly or randomly polarized, as in the case of solar energy, a two-dimensional array of elements is provided. The elements of the two-dimensional array are positioned in mutually orthogonal directions having aligned columns and rows, and the elements preferably have symmetrical bases, such as a square or circle. Voltage differences are derived between adjacent pairs in both orthogonal directions to provide maximum conversion efficiency of the circularly or randomly polarized wave energy.

Because the conversion process is in response to the wave properties of the impinging electromagnetic wave energy, rather than the quantum properties of such waves, and because of the small number of loss mechanisms individually and collectively optimal, it is believed possible to achieve conversion efficiencies considerably greater than existing solar cell type devices. A major advantage of the present invention is the separation of the wave absorption means and the conversion means permitting each to be individually optimized for the incident wave electromagnetic power spectrum. Another major advantage is that by suitable choice of geometry for the absorbing elements the device can be made to match the incident radiation spectrum. There is no known means of achieving this desirable result with present art solar cells. Another advantage of the present invention is that it does not utilize temperature-sensitive active semiconductor elements, for the basic absorption process; the only semiconductor components are passive diodes. A further advantage of the present invention is that the substrate on which the elements are mounted can be mechanically flexible, to substantially eliminate many of the problems inherent with prior art fragile solar cells mounted on rigid substrates.

It is, accordingly, an object of the present invention to provide a new and improved device for converting electromagnetic wave energy into electric power.

Another object of the invention is to provide a new and improved device for converting wide band electromagnetic wave energy into electric power with relatively high efficiency, utilizing the wave properties of the energy.

An additional object of the invention is to provide a new and improved device for converting circularly or randomly polarized electromagnetic wave energy into electric power in response to electric field gradients.

A further objet of the invention is to provide a relatively inexpensive device for converting electromagnetic wave energy into electric power, which device is relatively temperature-insensitive and can be mounted on a flexible substrate.

An additional object is to provide a new and improved integrated circuit type device for converting solar energy into electric power.

An additional object is to provide a new and improved means of matching the response of the device to the incident electromagnetic wave spectrum.

The above and still further objects, features and advantages of the present invention will become apparent upon consideration of the following detailed description of several specific embodiments thereof, especially when taken in conjunction with the accompanying drawings.

DETAILED DESCRIPTION OF THE DRAWING

Figure 1:
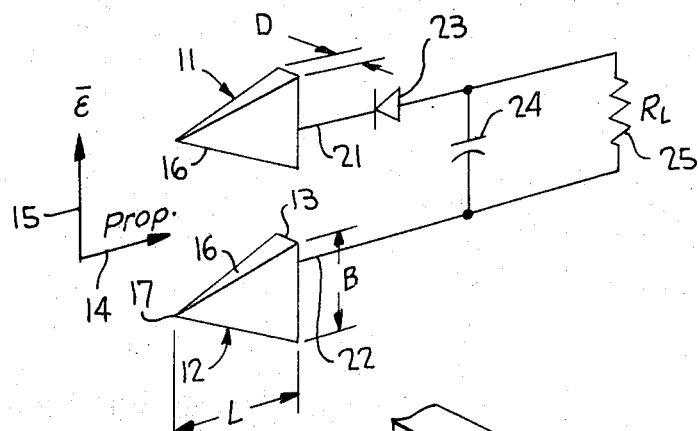
FIG. 1 is a perspective view schematically illustrating the principles of the present invention.

Reference is now made to FIG. 1 of the drawing wherein is illustrated a pair of mutually insulated, substantially identical, pyramidal or conical, aligned and relatively closely packed, preferably metallic, as copper or other suitable material, electromagnetic wave absorber elements 11 and 12 which are responsive to plane polarized wide band electromagnetic wave energy that is propagating in a direction indicated by arrow 14 and has an electric field with a gradient in a direction indicated by arrow 15. Elements 11 and 12 are constructed so that the shapes of every cross section parallel to their bases 13 are similar; the cross-sectional areas decrease for increasing distances from the bases 13 of the elements. Each of elements 11 and 12 includes a co-planar base 13, which may have any desired configuration, such as a rectangle, square or circle, that lies in a plane at right angles to the direction of wave propagation and is parallel to the electric field gradient 15. Elements 11 and 12 have a substantial height, L, or length in the direction of wave energy propagation, between their base 13 and apex 17. The height is generally several (up to approximately seventy five) wave lengths of the longest wavelength of the incident electromagnetic energy. Elements 11 and 12 include adjacent, tapered side surfaces 16 that converge toward base 13 and are positioned relative to each other to intercept the electric field 15 and absorb energy over a wide band of the electromagnetic wave. The apex of absorber elements 11 and 12 may be truncated in which case L is the length of the truncated absorber elements.

Voltage variations derived in elements 11 and 12 in response to the electric field variations of the electromagnetic wave energy impinging on surfaces 16 are transduced or converted into an electric voltage at terminals 21 and 22 of the elements. The voltages at terminals 21 and 22 are replicas of the electric field variations impinging on absorber elements 11 and 12, whereby the voltage difference between terminals 21 and 22 is proportional to the electric field gradient established by the plane polarized wave between facing surfaces 16 of elements 11 and 12.

The centerline spacing between adjacent elements 11 and 12 is such that for the incident electromagnetic wave spectrum, maximum voltage between 21 and 22 occurs. It is of the order of a wavelength or less of the incident electromagnetic energy. The present invention responds to this voltage difference as derived over the desired spectrum of the incident wave energy, to convert the wave energy into electric power.

The voltage difference between terminals 21 and 22 is converted into useful d.c. electric power by a rectifier 23 and a filter capacitor 24, the voltage across which is supplied to a suitable external load, such as resistor 25. The cathode is connected between the anode of the rectifier diode and terminal 22. It is to be understood that a full wave rectifier can be employed and that the d.c. voltage developed across external load 25 can be supplied to any suitable device, such as a d.c.-to-a.c. power frequency device.

The breadth, B, and depth, D, of base 13 as well as the length, L, and spacing between the elements 11 and 12 enable the band width to which the elements 11 and 12 are responsive to be adjusted to provide optimum matching to the spectrum of the electromagnetic wave energy impinging on absorber elements 11 and 12. Close spacing between adjacent elements 11 and 12, in addition to enabling the electric field gradient to be coupled with the greatest voltage difference to terminals 21 and 22, enables the electric field to be effectively trapped in the converging interstices between facing, adjacent elements 11 and 12. Trapping of the electric field variations occurs because elements 11 and 12 are absorptive to the electric electromagnetic wave energy, whereby the energy is not reflected and re-radiated from the elements.

Because the device of FIG. 1 is responsive to a plane polarized electromagnetic wave, it is preferable for the depth, D, of each of the elements 11 and 12 to be relatively narrow, less than ¼ wave length, so that adjacent elements (not shown) can be packed as closely as possible to either side of elements 11 and 12 in the horizontal direction. Close packing of the elements enables maximum conversion of the electromagnetic wave energy into electric power over the entire area of an array which may be fabricated out of a multiplicity of element pairs as illustrated in FIG. 1. It is to be noted that the device of FIG. 1 is responsive most efficiently to electromagnetic waves polarized so that the E field is in a plane parallel or coplanar with the long dimension of bases 13. If the electromagnetic wave polarization direction were rotated 90°, there would be no substantial electric field variation between the adjacent elements 11 and 12 and there would be substantially zero voltage developed between terminals 21 and 22 with a resulting zero conversion of electromagnetic wave energy into electric power.

The power of the electromagnetic wave incident on absorber elements 11 and 12 is the incident power density times the effective area of the two elements and can thereby be stated approximately as: $2(\bar{E} \times \bar{H})BD$, where $\bar{E}$ and $\bar{H}$ are respectively the electric and magnetic fields of the wave energy. The power indicated by the equation is available so that it can be converted into electric power supplied to a load, except for losses in elements 11 and 12, rectification, and stray losses. The losses of elements 11 and 12 are principally due to skin effect or di-electric losses, while the rectifier losses are the series resistance of the diode and stray losses are of the capacitor, and supporting substrate for elements 11 and 12. Stray losses can be minimized by locating elements 11 and 12 on a low loss dielectric substrate to minimize loss currents between the abosrber terminals.

The maximum wavelength restriction (about 75λ of the longest wavelength of the received spectrum) is provided to enable the shortest wavelength of the desired spectrum to be trapped between adjacent elements and to provide a relatively large surface area for extracting power from it. If the maximum wavelength restriction, which corresponds approximately with the length of a cone in an eyeball of a mammal (about 75λ of the longest wavelength of the received spectrum), is exceeded by the incident electromagnetic energy spectrum, then the voltage output between terminals 21–22 of the device decreases.

If the device of FIG. 1 is utilized to convert plane polarized microwave electromagnetic wave energy into electric power, the rectifier circuit can be connected to the terminals by a coaxial cable having a center conductor connected directly to terminal 21 and a shielded outer conductor, possibly with a conventional balun, connected to terminal 22. In the alternative, the rectifier circuit can be connected to elements 11 and 12 by a wave guide excited by the voltage difference between terminals 21 and 22 so that propagation in the wave guide is in one of the transverse electric modes, such as $TE_{01}$. In such a configuration, upper and lower conducting surfaces of a rectangular wave guide, between which the electric field is developed, are respectively connected to terminals 21 and 22.

One microwave absorber actually constructed and tested in accordance with the present invention includes a pair of sheet copper pyramidal elements 11 and 12 having a length (L) of 13.3 centimeters, a breadth (B) of 6.3 centimeters, and a depth (D) of 2.0 centimeters. This absorber pair had a center frequency of approximately 475 Mhz and a pass band between approximately 200 and 700 Mhz. Increasing the length of the abosrber elements, without any changes in the base dimensions of the pyramid, lowered the pass band center frequency, as well as the upper and lower cut-off frequencies.

Figure 2:
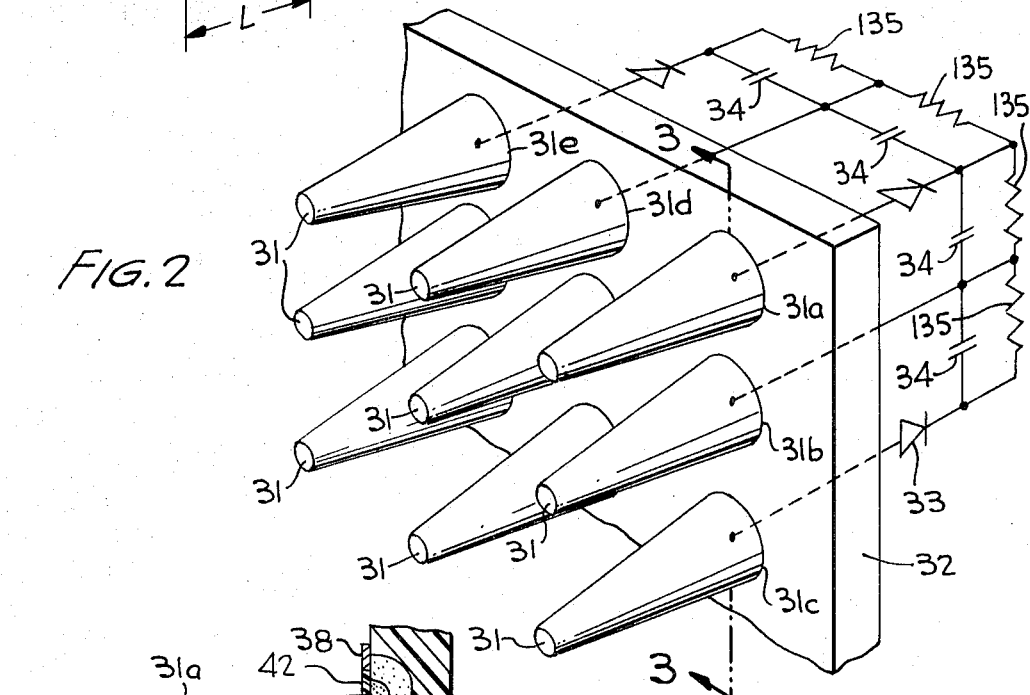
FIG. 2 is a perspective diagram illustrating an embodiment of the invention particularly adapted for converting solar energy into electric power.

The basic converter structure of FIG. 1 can be modified, as illustrated in FIG. 2, to respond to circularly polarized electromagnetic waves or randomly polarized electromagnetic waves, as subsist in solar energy. In FIG. 2, a multiplicity of absorber elements 31 are arranged in a two-dimensional array of aligned orthogonally directed columns and rows. Elements 31 are mutually insulated from each other and mounted on a dielectric substrate 32, which is preferably flexible but may be rigid. Each of elements 31 preferably has a symmetrical base and cross section parallel to the base, which may be either circular or square, to enable equal voltages to be derived between adjacent ones of elements 31 in the two orthogonal directions in response to orthogonal electric field components at the same wavelength. Thereby, the total array power output of FIG. 2 is insensitive to the polarization direction of the energy impinging thereon and the array can respond to circularly polarized, as well as randomly polarized electromagnetic wave energy.

To convert the electromagnetic wave energy impinging on elements 31 into electric power, adjacent elements are interconnected with each other by a half wave rectifying network similar to that illustrated in FIG. 1. In particular, aligned vertical elements 31a, 31b, and 31c are interconnected so that the anodes of rectifier diodes 33, connected to elements 31a and 31c (which are separated from each other by element 31b) are connected directly to the elements, while the cathodes of the rectifier diodes are connected to one electrode of different capacitors 34, the other electrodes which have a common connection to element 31b. Similarly, horizontally aligned elements 31a, 31d, and 31e are connected to rectifier circuits such that the center element of the triad has a common connection to a pair of capacitors 34 which are connected to the cathodes of diodes 33, having anodes connected to be responsive to the voltage replicas respectively derived by absorber element pairs 31a–31d and 31e–31d. D. C. voltages developed across capacitors 34 are supplied to a matrix of load resistors 135, one of which is connected across each of the capacitors.

Elements 31 of FIG. 2 are illustrated as frustoconical structures having upper bases with considerably smaller areas than the bases of the elements that are secured to substrate 32. The frusto-conical configuration is preferred in certain instances because sharp points, as illustrated in the pyramidal elements 11 and 12, FIG. 1, may have a tendency to fracture.

Figure 3:
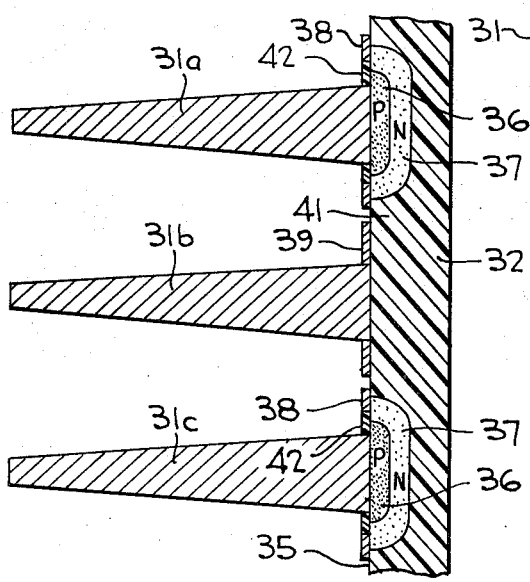
FIG. 3 is a side sectional view of the embodiment illustrated in FIG. 2, along the lines 3—3.

To enable the structure illustrated in FIG. 2 to function as a device for converting solar electromagnetic wave energy, which has the majority of its power in the spectrum from 0.3 to 1.1 microns, into d.c. power, the element dimensions and inter-element spacing must be on the order of a micron, whereby integrated circuit techniques are preferably employed in fabrication. To this end, a solar energy converter in accordance with the present invention may take the form illustrated by the cross-sectional view illustrated in FIG. 3 but not limited to this embodiment. In FIG. 3, electrically conductive cones 31a, 31b, and 31c project from surface 35 of substrate 32. Alternate ones of cones 31, such as cones 31a and 31c, are ohmically connected to a P-doped regions 36 of substrate 32, which are formed on surface 35 of substrate 32 in super-position with the bases of cones 31a and 31c. A junction is formed between P-doped regions 36 and N-doped regions 37 which are formed in substrate 32 beneath P-doped regions 36. Regions 36 and 37 respectively correspond with the anode and cathode of diodes 33 connected to cones 31a and 31c, FIG. 2. Annular, dielectric oxide films 42 are formed on face 35 over the intersections between the otherwise exposed portions of the junctions between regions 36 and 37. Oxide films 42 cover the peripheries of P-doped regions 36 and the inner circumference of N-doped regions 37. On the portion of P-doped regions 36 not covered by oxide films 42 and the inner radial portion of the films, metal elements 31a and 31c are placed. The bases of elements 31a and 31c are ohmically connected to P-doped regions 36. Annular, metal films 38 are formed on face 35 in superposition with the otherwise exposed regions 37 to form ohmic contacts with the N-doped regions. Metal films 38 are electrically insulated from elements 31a and 31c by dielectric films 42 which are disposed between metal films and elements. Metal film 39 is formed on face 35 at the base of element 31b and is electrically connected to the base. The areas 41 of substrate 32 between adjacent metal films 38 and 39 form dielectrics for capacitors 34, having electrodes comprised of the metal film portions 38 and 39. A d.c. load is connected between metal film portions 38 and 39 so that the film portions form load terminals.

The structure of FIG. 3 is formed by diffusing P and N regions 36 and 37 onto surface 35 of substrate 32, utilizing conventional integrated circuit techniques. Regions 36 and 37 are diffused only onto the areas beneath and slightly to the sides of where cones 31a and 31d are to be located. Thereafter, annular oxide regions 42 are formed over the exterior portion of P-doped region 36 and over a slight segment of the interior of N-doped region 37 on surface 35. After oxide regions 42 have been formed, thin metal film contacts 38 are vacuum vapor deposited on the exposed portions of N regions 37. Simultaneously with the formation of contacts 38 thin, metal film, annular contact 39 is vacuum vapor deposited on surface 35 in the region outside of cone 31b. After metal films 38 and 39 have been deposited, cones 31a, 31b, and 31d are suitably attached.

While metal is believed preferable in most instances for the absorber elements, it is to be understood that dielectric elements can also be utilized as elements for directing electromagnetic wave radiation to an optical to d.c. converter diode. The dielectric elements would preferably have the same configuration and dimensions as indicated supra while the optical to d.c. converter diode may be of a type described by Javin in the IEEE Spectrum, October, 1971, page 91.

While there have been described and illustrated several specific embodiments of the invention, it will be clear that variations in the details of the embodiments specifically illustrated and described may be made without departing from the true spirit and scope of the invention as defined in the appended claims.

I claim:

1. A device for converting electromagnetic wave energy having an electric field into electric power comprising a plurality of mutually insulated electromagnetic wave absorber elements each responsive to the electric field, adjacent ones of said elements converging toward each other in the direction of the wave propagation, each element including means for deriving a voltage replica of variations of the electric field intercepted by the element, adjacent ones of said elements being positioned relative to each other so that an electric field subsists between said adjacent elements, and means responsive to the voltage difference between the derived voltage replicas between two adjacent elements.

2. The device of claim 1 wherein each of the absorber elements is metallic.

3. The device of claim 1 where each of the absorber elements comprises a metallic surface and has a length in the direction of wave propagation several wavelengths of the impinging electromagnetic wave.

4. The device of claim 3 wherein the adjacent elements have substantially coplanar bases, and the spacing between the adjacent elements at the bases thereof is of the order of no more than a wavelength of the electromagnetic energy.

5. The device of claim 1 wherein the adjacent elements have substantially coplanar bases, and the spacing between the adjacent elements at the bases thereof is of the order of no more than a wavelength of the electromagnetic energy.

6. The device of claim 1 wherein the conversion means responsive to the voltage difference includes means for rectifying the voltage difference to derive a d.c. voltage.

7. A device for converting circularly polarized or randomly polarized electromagnetic wave energy having an electric field into electric power comprising a two-dimensional array of mutually insulated electromagnetic wave absorber elements each responsive to a component of the electric field, each elements converging toward each other in the direction of propagation of the wave and including means for deriving a voltage replica of variations of the electric field intercepted by the element, adjacent ones of said elements being positioned relative to each other so that an electric field subsists between said adjacent elements, and means responsive to the voltage difference between the voltage replicas derived between two adjacent elements, said pairs being spaced at right angles to each other in the array.

8. The device of claim 7 wherein each of the absorber elements is metallic.

9. The device of claim 7 where each of the absorber elements comprises a metallic surface and has a length in the direction of wave propagation several wavelengths of the electromagnetic wave.

10. The device of claim 9 wherein the adjacent elements have substantially co-planar bases and the spacing between the adjacent elements at the bases thereof of the order of one wavelength or less of the electromagnetic energy.

11. The device of claim 7 wherein the adjacent elements have substantially coplanar bases and the spacing between the adjacent elements at the bases thereof is of the order of one wavelength or less of the electromagnetic energy.

12. A device for converting solar, randomly polarized electromagnetic wave energy in the wave length band from approximately 0.3 to 1.1 microns into electric power comprising a dielectric substrate having a face substantially at right angles to the direction of propagation of the solar electromagnetic wave energy, a plurality of mutually insulated electromagnetic wave, metallic absorber elements mounted on said face, each of said elements including tapered portion extending away from the face in the direction of propagation of the wave energy, each of said elements having a decreasing cross-sectional area as the distance from the face increases and a length in the direction of propagation of the wave several wavelengths of the shortest wavelength of the spectrum, an integrated circuit diode in said substrate connected to be responsive to wave energy intercepted by alternately spaced ones of said elements, a metallic film on said substrate ohmically connected to the remaining metallic elements, whereby a capacitor is formed in the substrate dielectric between adjacent ones of said metallic films.

13. The device of claim 12 wherein each of the elements includes a base with a symmetrical geometry in contact with said face, each element having a cross section parallel to the base similar to the base.

14. The device of claim 13 wherein said face has a square cross section.

15. The device of claim 13 wherein said face has a circular cross section.

16. The device of claim 13 wherein each of said elements is a frustum.

17. The device of claim 12 wherein the spacing between adjacent ones of said elements is of the order of one wavelength or less of the shortest wavelength of the spectrum.

18. The device of claim 12 wherein the several wavelengths are between 1.25 and 75.

19. A device for converting solar, randomly polarized electromagnetic wave energy in the wave length band from approximately 0.3 to 1.1 microns into electric power comprising a dielectric substrate having a face substantially at right angles to the direction of propagation of the solar electromagnetic wave energy, a plurality of mutually insulated electromagnetic wave, metallic absorber elements mounted on said face, each of said elements including a tapered portion extending away from the face in the direction of propagation of the wave energy, each of said elements having a decreasing cross-sectional area as the distance from the face increases, adjacent ones of said elements being spaced from each other by a distance on the order of a wavelength or less of said energy, an integrated circuit diode in said substrate connected to be responsive to wave energy intercepted by alternately spaced ones of said elements, a first metallic film on said substrate ohmically connected to one electrode of each of said diodes, a second metallic film on said substrate ohmically connected to the remaining metallic elements, said first and second films including load terminals whereby a capacitor is formed in the substrate dielectric between adjacent ones of said metallic films, and said load terminals.

* * * * *